United States Patent [19]
Göckelmann

[11] Patent Number: 5,153,016
[45] Date of Patent: Oct. 6, 1992

[54] COFFEE MACHINE

[75] Inventor: Karl Göckelmann, Gerstetten, Fed. Rep. of Germany

[73] Assignee: WMF Württembergische Metallwarenfabrik Aktiengesellschaft, Geislingen/Steige, Fed. Rep. of Germany

[21] Appl. No.: 655,331

[22] Filed: Feb. 14, 1991

[30] Foreign Application Priority Data

Feb. 20, 1990 [EP] European Pat. Off. ......... 90103263.1

[51] Int. Cl.$^5$ ............................................... A23L 2/38
[52] U.S. Cl. ............................... 426/433; 99/289 R
[58] Field of Search ............ 99/289 R, 289 P, 289 T, 99/295, 297, 300, 302 R, 302 P, 304, 307; 426/433

[56] References Cited

U.S. PATENT DOCUMENTS

| | | | |
|---|---|---|---|
| 2,899,885 | 8/1959 | Thompson | 99/289 R |
| 2,935,928 | 5/1960 | Keating et al. | 99/297 |
| 3,103,873 | 9/1963 | Breitenstein | 99/302 R |
| 3,369,478 | 2/1968 | Black | 99/297 |
| 4,271,752 | 6/1981 | Valente et al. | 99/302 R |
| 4,796,521 | 1/1989 | Grossi | 99/302 P |
| 4,885,986 | 12/1989 | Grossi | 99/302 P |

FOREIGN PATENT DOCUMENTS

| | | |
|---|---|---|
| 2286628 | 9/1975 | European Pat. Off. |
| 2012503 | 3/1970 | Fed. Rep. of Germany . |
| 2912841 | 3/1979 | Fed. Rep. of Germany . |
| 3316159A1 | 5/1983 | Fed. Rep. of Germany . |
| 3843568C1 | 12/1988 | Fed. Rep. of Germany . |
| 0266438 | 7/1929 | Italy ...................... 99/291 |
| 2162051A | 4/1985 | United Kingdom . |
| 2167943 | 6/1986 | United Kingdom ........... 99/300 |

*Primary Examiner*—Philip R. Coe
*Assistant Examiner*—James F. Hook
*Attorney, Agent, or Firm*—Finnegan, Henderson, Farabow, Garrett & Dunner

[57] ABSTRACT

A coffee machine (1) with a brewing apparatus (7) is described which has a brewing chamber (9) and a piston (37) being movable to and fro herein. One of the front sides of the brewing chamber (9) contains an opening (44) which is cleared by a closing element (8) in one of its positions (I) for apportioning coffee powder and is closed in another position (II). A stripper (48) is provided for stripping off and ejecting the used up coffee grounds. In order to constructionally simplify such a coffee machine and to make it operatively more reliable and more robust, it is suggested to move the closing element (8) only relative to the brewing chamber in a plane extending in parallel to the opening (44) and to couple the stripper (48) to the closing element (8) in its movement.

13 Claims, 6 Drawing Sheets

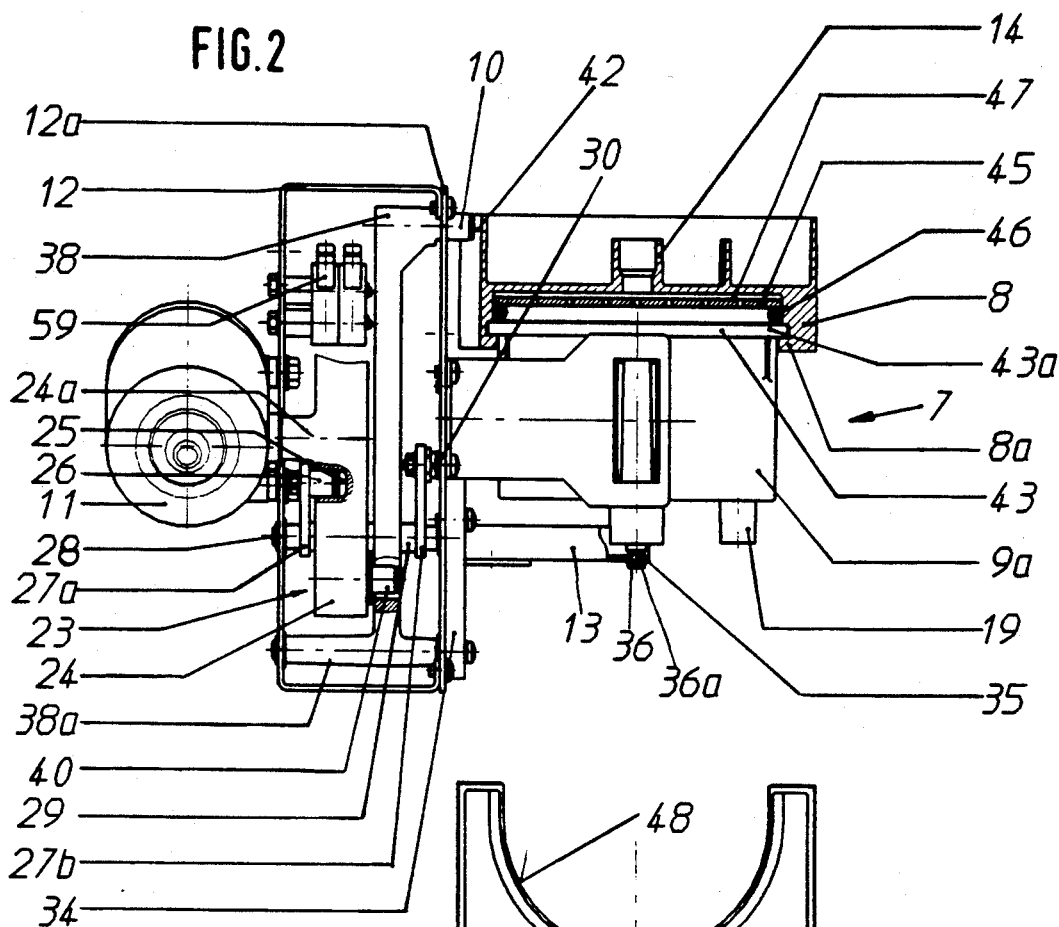
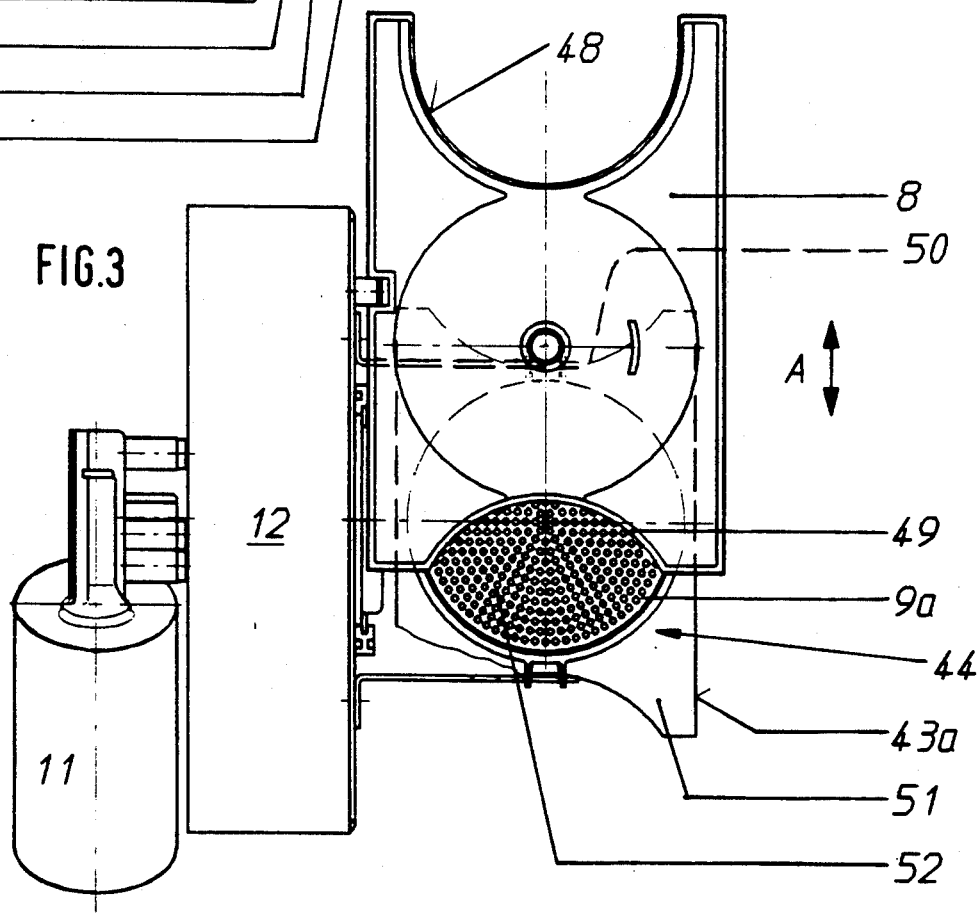

COFFEE MACHINE

BACKGROUND OF THE INVENTION

The invention relates to a coffee machine of the type having a brewing means which contains a brewing chamber limited by a circumferential wall, in which a piston movable to and fro is disposed and whose one side has an opening, a closing element being movable relative to the brewing chamber via a gear which releases the opening for apportioning coffee powder in a first position and closes it in a second position and a stripper moving across the opening for ejecting the used up coffee grounds in the case of a raised piston.

Such a coffee machine is known from DE-OS 29 12 841. The known coffee machine has an upright, prismatic brewing chamber, at whose upper front side an opening is provided for filling in the coffee powder and for ejecting the used up coffee grounds. A piston moves up and down in the brewing chamber, which is displaced in one of its positions that far upwardly that its piston surface is in alignment with the upper edge of the brewing chamber. A closing element designed as a further piston is provided for closing the opening of the brewing chamber, which is movable from its position closing the opening at first vertically upwardly and then that much horizontally alongside of the brewing chamber that the opening is open towards above. A feed receptacle is provided for apportioning coffee powder, which can be moved in horizontal direction that much above the brewing chamber that coffee powder falls into the brewing chamber through an opening. After completion of the apportioning process, the feed receptacle is again moved alongside the brewing chamber. A stripper for stripping off and ejecting the used up coffee grounds is disposed at the edge of the feed receptacle leading upon the movement of the feed receptacle into its apportioning position. After the completion of a preceding brewing process or prior to the beginning of a new brewing process, the closing element is thus at first moved upwardly and then to the side so that the opening of the brewing chamber is open. Then the piston in the brewing chamber moves that much upwardly until its piston surface is in the plane of the opening, the used up coffee grounds thus project from the opening.

Then the feed receptacle with the leading stripper moves across the opening, the stripper pushing the used up coffee grounds to the opposite side of the brewing chamber. The piston in the brewing chamber moves again downwardly so that now the coffee powder for the new brewing process can be apportioned After the completion of the apportioning process the feed receptacle moves again into its starting position; however, the stripper is then also returned over the opening of the brewing chamber. During this return, the stripper of the known coffee machine is to clean once again the upper part of the brewing chamber. However, since this movement is effected in a direction opposite to the first cleaning movement, the used up coffee grounds possibly still located on the edge of the opening are pushed towards the inside and fall onto the new coffee powder in the brewing chamber. The stripper moves moreover over the opening in the further course of its movement so that coffee grounds adhering to it may also fall into the brewing chamber filled with new coffee powder. Coffee grounds residues in the brewing chamber, however, can negatively influence the quality of the coffee brewed subsequently. The known coffee machine is moreover relatively complex due to the plurality of its moving elements and consequently also subject to more sources of failures. The linear movements of the feed receptacle must e.g. be exactly coordinated with the L-shaped movements (with vertical and horizontal components) of the closing element.

SUMMARY OF THE INVENTION

The invention is thus based on the object of providing a coffee machine with simplified, robust construction, which is nevertheless capable of complying with all desired functions including the stripping off of the coffee powder.

The object is accomplished by that the closing element is movable from the first position into the second position in parallel to the plane of the opening relative to it and that the stripper is movable together with the closing element.

No separate means for removing the closing element for the opening and closing of the opening of the brewing chamber need be provided in the coffee machine according to the invention, which complicates the construction of the brewing chamber. Due to this, there is moreover sufficient space so that the apportioning means can be disposed directly above the brewing means. It is furthermore possible due to the movement in parallel to the opening of the brewing chamber, which is now alone necessary, to dispose the stripper in such fashion that the closing element moves simultaneously with the stripper. In this fashion only a single type of movement of only a single element is necessary for opening and closing the brewing chamber, for the stripping off of the coffee grounds and for preparing the brewing chamber for the filling in of coffee powder.

It is of special advantage if the closing element can adopt a third position relative to the brewing chamber. In this preferred embodiment, the closing element for stripping off and ejecting the used up coffee grounds also is moved into a third position and back, the stripper being located outside the opening in the third position and being at the leading side of the closing element during stripping off. Due to a suitable control movement it can be ensured that the stripper only moves over the opening of the brewing chamber after a stripping off process, when the subsequent brewing process is completed or a stripping off process is directly forthcoming so that there are only coffee grounds to be ejected in the brewing chamber during the return movement. A cleaning means for the stripper is superfluous due to this measure.

The third position of the closing element can be provided at the side of the opening substantially opposite to the apportioning position in a constructionally especially simple fashion so that the closing element is right away in the apportioning position. Specifically, the closing element is located in its first position on one side of the opening and in its third position on a substantially opposite side of the opening of the brewing chamber.

The construction is further simplified if the closing element is displaced along a straight line and is located at opposite sides of the opening in its first and third positions or by means of the fastening of the stripper directly to the closing element at one side thereof.

Due to the development wherein a guide means for the coffee powder to be apportioned is disposed at a side of the closing element not facing the stripper, coffee powder to be apportioned is safely guided from the coffee powder receptacle to the opening of the brewing chamber also across the distance caused by the height of the closing element.

When the stripper has a shape adapted to the shape of the circumference of the opening of the brewing chamber, the used up coffee grounds are ejected as far as possible in the form of an uncrumbled cake, whereby the risk that the coffee grounds adheres to the brewing chamber of the brewing chamber piston is further reduced.

The seal disposed around the piston circumference according to a further preferred construction is of special advantage. In particular, a seal sealing the piston against the circumferential wall is provided around a surface (brewing strainer) of the piston, which faces the brewing chamber, the seal being flush with the surface of the piston. It is prevented by means of this seal that coffee grounds particles are pressed into the boundary area between piston and circumferential wall of the brewing chamber and remain in the brewing chamber due to this upon the return movement of the piston and are thus mixed with new coffee powder.

Having the seal be a lip seal extending outwardly at a slant angle and obliquely in the direction of the brewing chamber is an especially effective arrangement and development.

An especially preferred construction includes a gear which manages with a single driving motor, which takes over both the drive of the piston and of the closing element and which is of a simple construction and a reliable function. Specifically, the gear contains a disk controlling the movements of the piston and of the closing element relative to the brewing chamber and rotatably driving about an axis of rotation and a first and second rocker movable in pendulum fashion. The first rocker is provided with a driving pin which engages in a continuous groove in the disk and the second rocker has a slide guide for a driving pin affixed to the disk outside the axis of rotation. The first rocker is connected to a linearly movable guide plate which is in connection with the piston via a support being firmly connected with it. The second rocker is provided with a driving pin which engages in a guide on the closing element.

BRIEF DESCRIPTION OF THE DRAWINGS

An example of embodiment of the invention is explained in greater detail in the following by means of the drawings.

FIG. 2 shows an enlarged, more detailed representation of a lateral section of the brewing means according to FIG. 1.

FIG. 3 shows the top view of an enlarged, more detailed representation of the brewing means.

DESCRIPTION OF THE PREFERRED EMBODIMENTS

Figure 1:
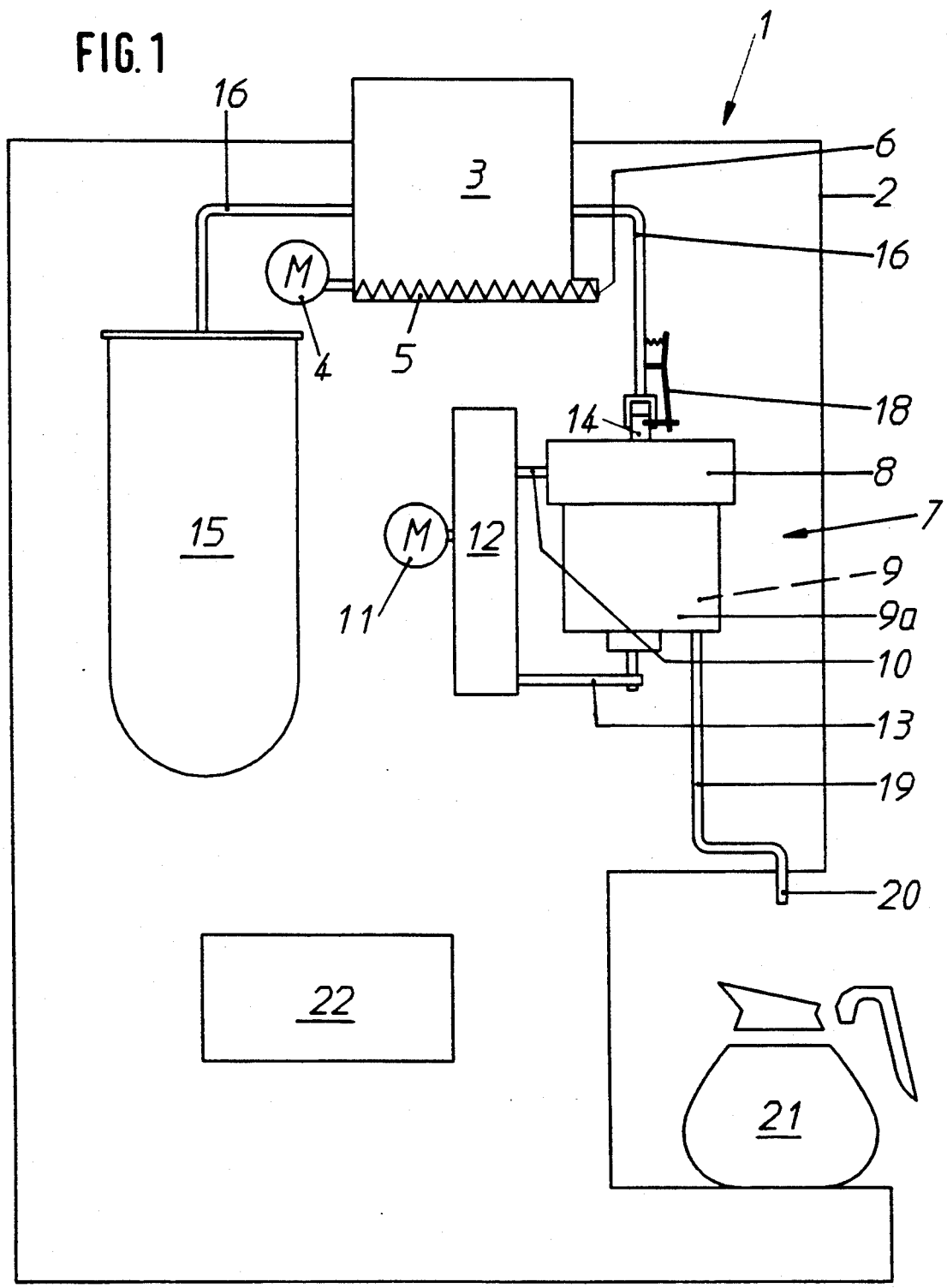
FIG. 1 shows a schematic representation of a lateral view of the most essential features of a coffee machine equipped according to the invention.
Figure 5:
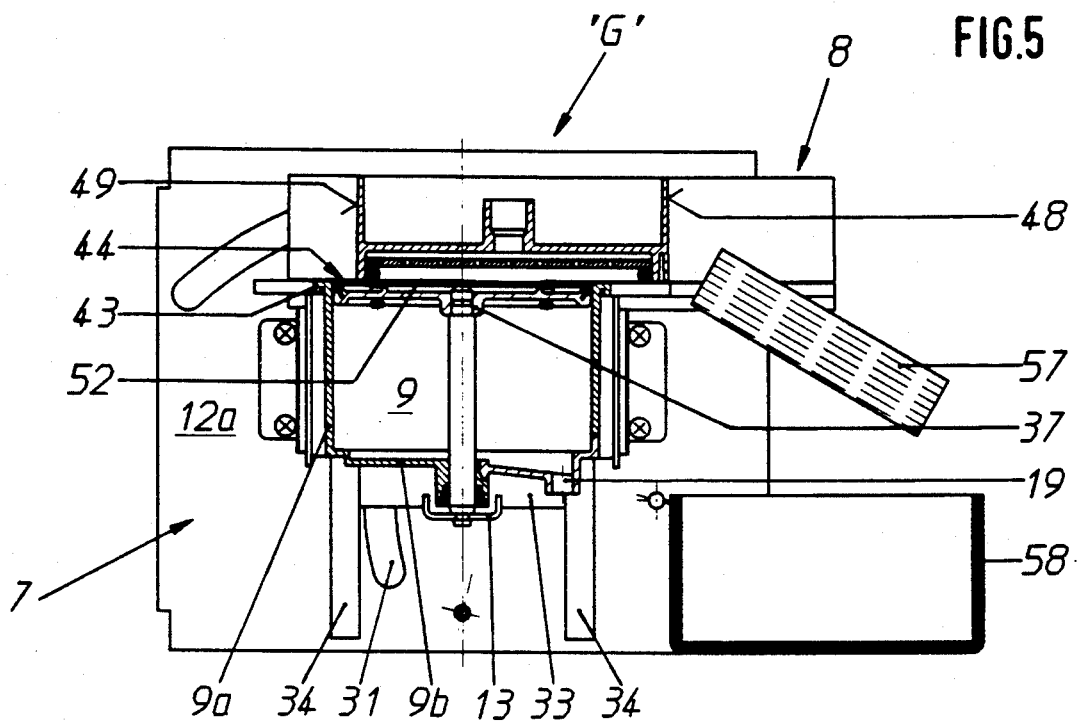
FIG. 5 is a sectional front view of the brewing means with a first position of closing element and piston.

A lateral view of the most esential features of a coffee machine 1 in schematic representation can be gathered from FIG. 1. The coffee machine 1 has a housing 2, whose upper cover wall is traversed by a reservoir 3 for the coffee powder. One of the customary apportioning screws 5 driven by a motor 4 is provided in the lower area of the reservoir 3, which conveys the coffee powder from the reservoir 3 towards the outside via an apportioning opening 6. The apportioning opening 6 is disposed vertically above a brewing means 7. The brewing means 7 contains a carriage designed as closing element 8 for a brewing chamber 9 laterally limited by a circumferential wall 9a, which can be moved relatively to the plane of the drawing in a manner which will still be described. The brewing means 7 is connected to a gear accommodated in a gear casing 12, actuated by a motor 11 via a driving pin 10. A support 13 is moreover represented on the gear casing 12, which will be explained below.

A spout 14 is disposed on the upper side of the carriage 8 into which a hot water line 16 ends, which is designed as a flexible tube and comes from a hot water apparatus 15. The tube 16 is detachably affixed in the spout 14 by a commercially available quick-release connector 18.

A coffee line 19 emerges at the lower side of the brewing chamber 9, which ends in a discharge opening 20 disposed outside the housing 2, underneath which a collecting vessel for coffee, a carafe 21 is represented, can be placed. The coffee line 19, however, can also be connected to one of the known reservoirs.

The operating sequence of the coffee machine is controlled by a control means 22 accommodated in the housing 2. As it is customary for coffee machines working automatically or semiautomatically.

Figure 6:
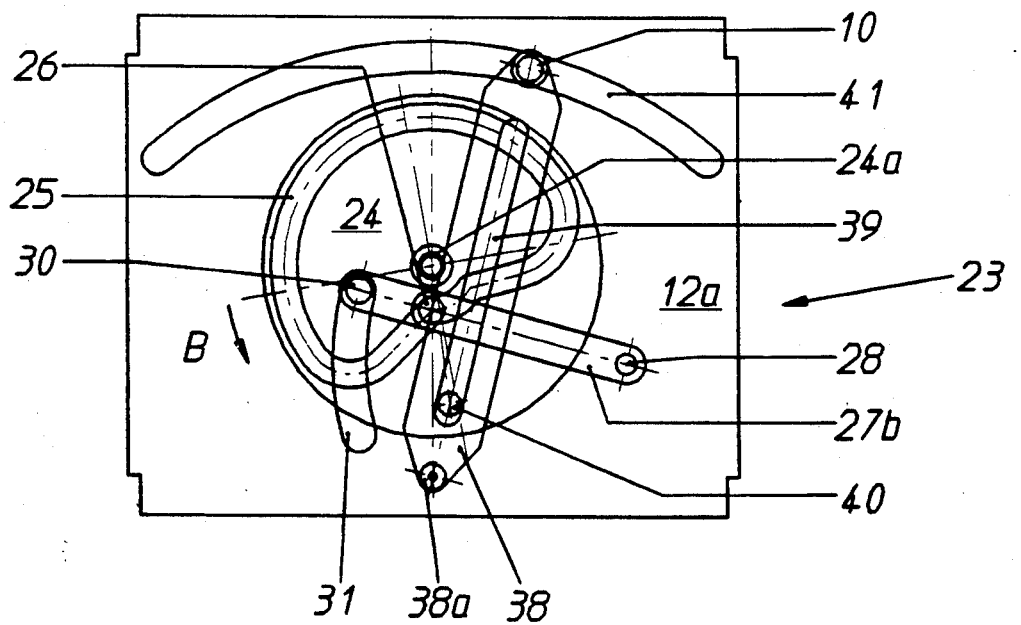
FIG. 6 shows the gear position corresponding to the position of closing element and piston of FIG. 5.
Figure 7:
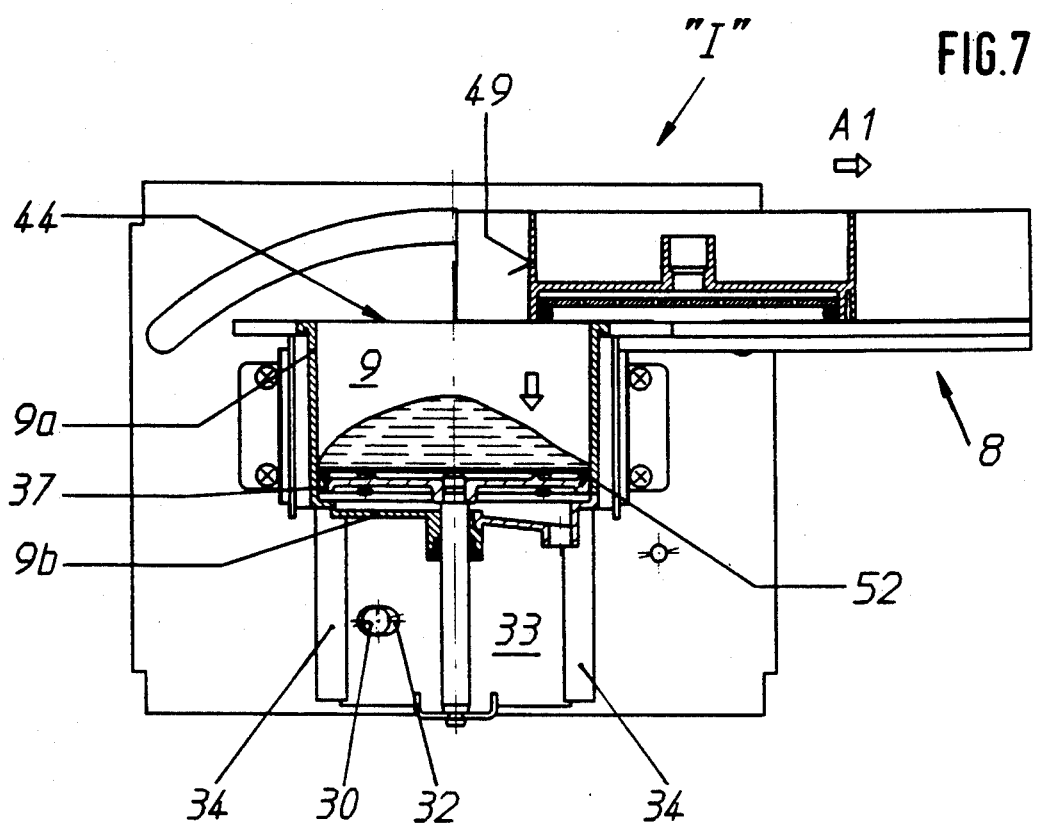
FIG. 7 shows a further position of closing element and piston.

The brewing means 7 with its gear 23 is represented in the following by means of FIGS. 2 to 7. The gear 23 contains a disk 24 driven rotatingly about an axis of rotation 24a by the motor 11. A groove 25 asymmetrically rotating about the axis of rotation 24a in a closed loop is incorporated into the side of the disk 24 facing the motor, into which a driving pin 26 engages. The driving pin 26 is connected to a first half-rocker 27a, which is rotatable about an axis of rotation 28 disposed on the gear casing 12. The rotatational movement of the first half-rocker is transmitted to a second half-rocker 27b via a sleeve 29, which is disposed on the side of the disk 24 opposite to the groove 25. The second half-rocker 27b supports a driving pin 30 at its end not facing the sleeve 29, which traverses a support plate 12a of the gear casing 12, which faces the brewing means 7 and is guided there in an oblong hole 31 (FIG. 6). The driving pin 30 traverses furthermore an opening 32 in a guide plate 33 (FIG. 7), which is displaceable in vertical direction in two guides 34 engaging over its lateral edges and disposed on the support plate 12a. A support 13 is fastened to the guide plate 33, which comprises a slot 35 at its free end pointing away from the guide plate 33, which is open at the front and is fitted into a corresponding recess 36a of a piston rod 36, so that the piston rod 36 is carried along upon the movement of the guide plate 33. A piston 37 is fixedly connected to the piston rod 36, which can be moved within the circumferential wall 9a to enlarge or reduce the volume of the brewing chamber 9. The gear 23 contains a further rocker 38, which is pivotable about an axis of rotation 38a in the gear casing 12. The rocker 38 has an oblong hole 39 extending along its longitudinal axis, in which a driving pin 40 can slide. The driving pin 40 is affixed to the disk 24 outside the axis of rotation 24a. The driving pin 10 connected to the carriage 8 is affixed to the end of the rocker 38 not facing its axis of rotation 38a. The driving pin 10 traverses an oblong hole 41 in the support plate 12a, which extends around the axis of rotation 38a and engages into a vertical groove 42 on the carriage 8.

The carriage 8 engages over lateral edges 43a of a sliding plate 43 with lateral guides 8a disposed in parallel to the support plate 12a. The sliding plate 43 is affixed to the circumferential wall 9a sparing a circular opening 44 covering the upper front surface of the brewing chamber 9. The opening 44 is thus in the plane of the sliding plate 43 so that the carriage 8 can move in the direction of the double arrow A along a straight line in a plane extending in parallel to the opening 44.

A distributing sieve 45 for the hot water is disposed in the central area of the carriage 8 which is of a substantially right parallelepiped shape at the side facing the sliding plate 43, whose circumferential shape corresponds substantially to the circumferential shape of the upper opening 44. The circumference of the distributing sieve 45 is sealed against the sliding plate 43 by means of a seal 46. A distributing chamber 47 is provided in the carriage 8 at the side of the distributing sieve 45 not facing the sliding plate 43, which extends across the entire surface of the distributing sieve 45 and is in communication with the interior of the spout 14 so that hot water can get from the hot water apparatus 15 into the distributing chamber 47 via the hot water line 16.

The carriage 8 is provided with a first and a second limiting wall 48, 49 bent in each case correspondingly to the opening 44 at its ends being opposite to each other in the direction of the double arrow A. The limiting walls 48, 49 extend substantially vertically to the plane in which the carriage 8 moves. The first limiting wall 48 forms substantially a semicircle, while the second limiting wall 49 approximately only extends across one third of the circumference of the opening 44. The first limiting wall 48 is designed as a stripper for used up coffee grounds. The second limiting wall 49 serves as a guiding means for coffee powder to be newly apportioned. The sliding plate 43 comprises suitably recesses 50, 51 being opposite to each other in the direction of the double arrow A, which have the the shape of circular segments, whose curvature corresponds approximately to the curvatures of the respectively allocated limiting walls 48, 49 or of the opening 44.

A brewing strainer 52 is affixed to the side of the piston 37 facing the opening 44, which fills the entire cross-sectional surface of the brewing chamber 9 and forms the upper surface of the piston 37. A collecting chamber 43 for coffee is disposed in the piston 37 beneath the brewing strainer 52, which is connected with the lower side of the piston 37 not facing the brewing strainer and thus with the coffee line 19 traversing a lower front wall 9b of the brewing chamber via openings (not shown).

Figure 4:
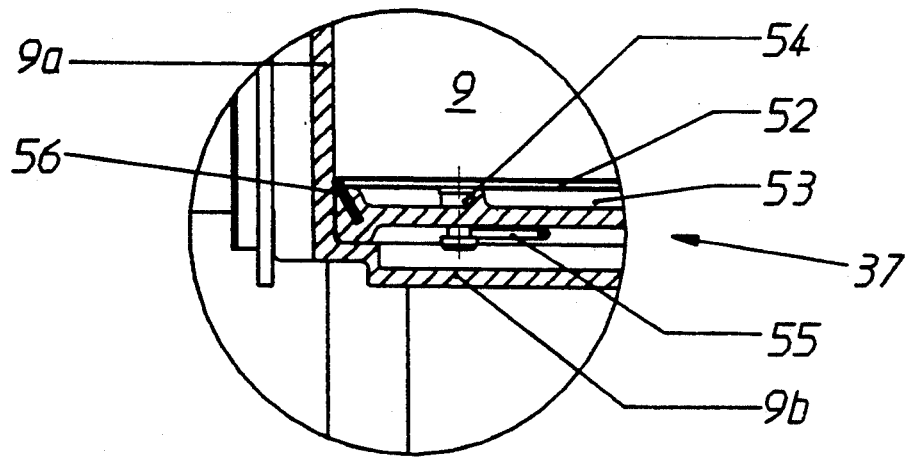
FIG. 4 is an enlarged individual representation of the seal between piston and circumferential wall of the brewing chamber.

As is shown by the enlarged detail representation of FIG. 4 weld bolts 54 are welded with the brewing strainer 52, which project through recesses in the piston 37 and are fastened there by means of stop springs 55. A lip seal 56 which is designed as a closed ring from a flexible sealing material and is disposed in such fashion in a slot in the piston 37, which extends obliquely upwardly and outwardly, that it completely fills the space between the circumference of the brewing strainer 52 and the circumferential wall 9a and is in closing alignment with the surface of the brewing strainer 52 facing the brewing chamber 9.

The function of the coffee machine 1 is explained in greater detail in the following by means of FIGS. 5 to 11. The carriage 8 is in a basic position G in FIG. 5. The carriage 8 is moved into this basic position G after the completion of each brewing process and after the ejection of the used up coffee grounds in the form of a coherent coffee grounds cake 57. The coffee grounds cake 57 falls into a collecting vessel 58 placed beneath the carriage and can thus be removed. The carriage 8 is somewhat shifted to the right with respect to the brewing chamber 9 in the position G so that a gap is formed at the carriage 8 between the circumferential wall 9a and the second limiting wall 49, through which the interior of the brewing chamber 9 can be aerated. The carriage 8 remains in this basic positon G until the beginning of a new brewing process, and coffee grounds particles possibly adhering to the first limiting wall 48 can dry and fall into the collecting vessel. FIG. 6 shows the gear position corresponding to the basic position G, the driving pin 30 being in its uppermost position in the oblong hole 31. Due to this the guide plate 33 with the support 13 is also in its uppermost position, in which the brewing strainer 52 ends flush with the sliding plate 43. The driving pin 26 is located in an area of the groove 25 which has a small distance to the axis of rotation 24a of the disk 24. The driving pin 40 is located at the area of the oblong hole 39 which rests against the axis of rotation 38a of the second rocker 38, while the driving pin 10 is in the righthand third of the oblong hole as this is shown in FIG. 6.

Figure 8:
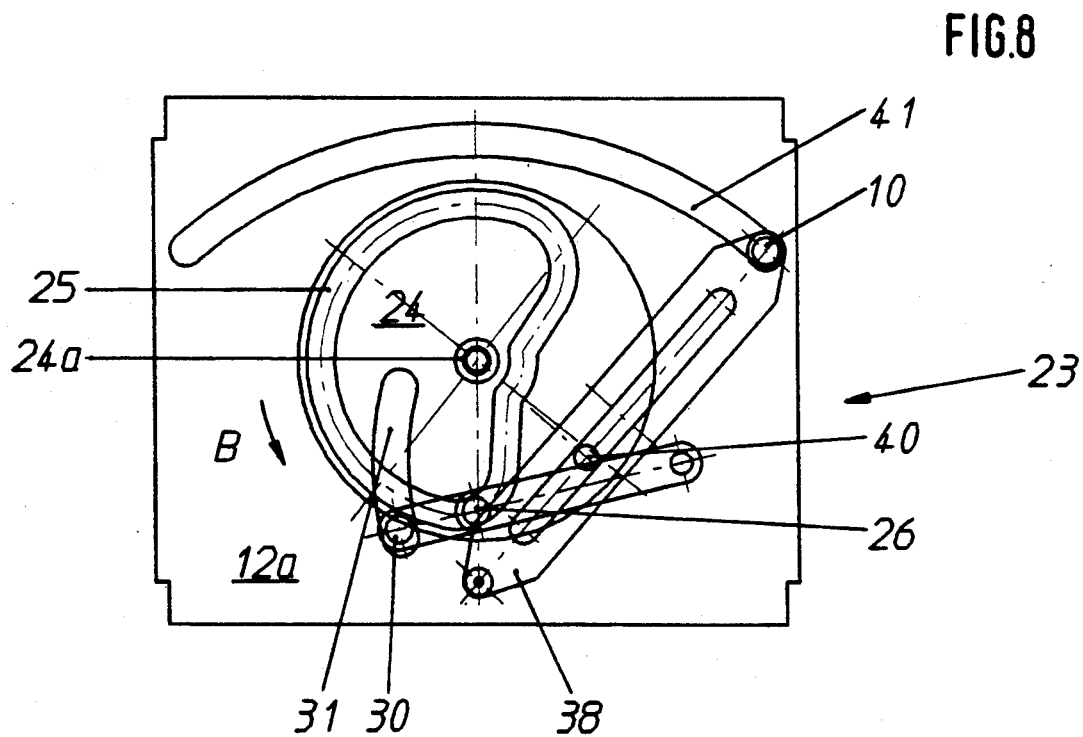
FIG. 8 shows the gear position corresponding to the position of closing element and piston according to FIG. 7.
Figure 9:
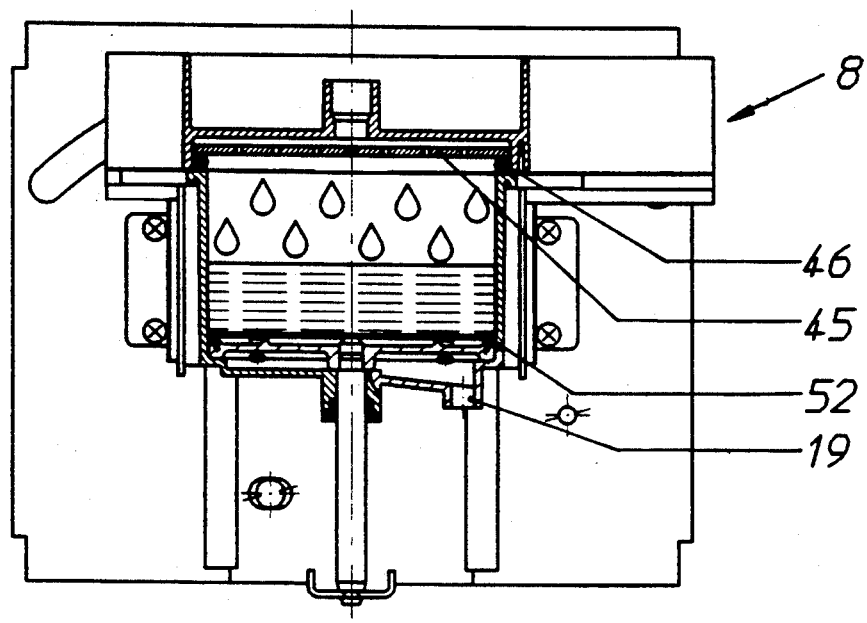
FIG. 9 shows a further position of closing element and piston.

If a new brewing process is started via the control means 22, the disk 24 is rotated by the motor in the direction of the arrow B until the gear adopts the position drawn in FIG. 8. The driving pin 30 is in its lower end position in the oblong hole 31 in this position of the gear, while the driving pin 26 in the groove 25 has moved away from the axis of rotation 24a. The driving pin 10 has moved into its righthand end position in the oblong hole 41. Thus the carriage 8 was moved towards the right into the first operating position I represented in FIG. 7 in the direction of the arrow A1. The carriage 8 clears the opening 44 for the apportioning of new coffee powder in this first operating position I, while the piston 37 has been withdrawn in the direction towards the lower front wall 9b of the brewing chamber. The second limiting wall 49 acting as guide means for the coffee powder is located outside the central area of the opening 44, but can be inwardly somewhat offset from the circumferential wall 9a in order to avoid a soiling of the upper areas of the circumferential wall 9a by coffee powder to be filled in.

Figure 10:
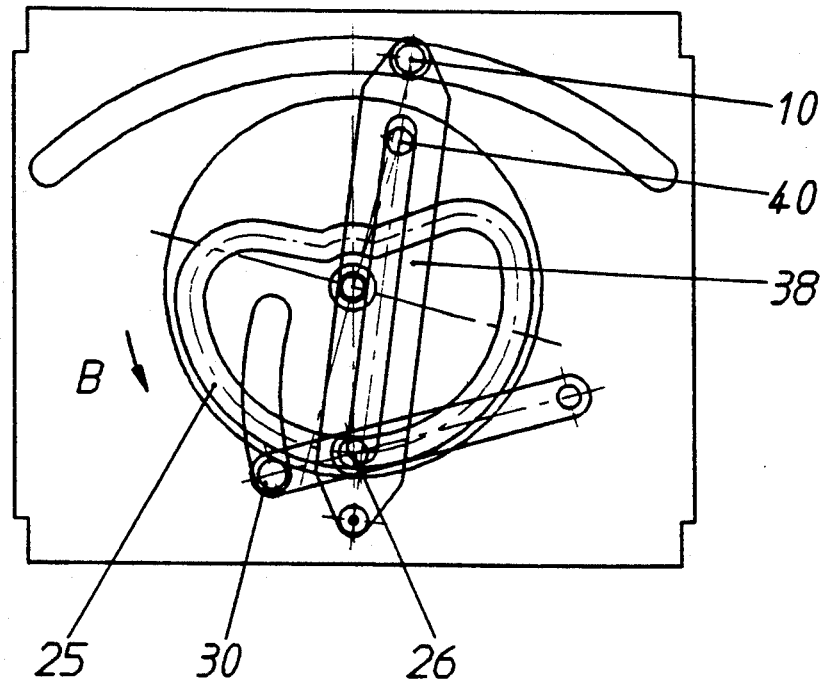
FIG. 10 shows the gear position corresponding to the position of closing element and piston and FIG. 11 shows a further position of closing element and piston.

Upon a further rotation of the disk 24 in the direction of the arrow B, the driving pin 40 is moved towards the left into the position drawn in FIG. 10 so that the rocker 38 with the driving pin 10 and thus the carriage move towards the left until the carriage closes the opening 44 of the brewing chamber 9 in a second operating position II. At the same time the circumference of the opening 44 is outwardly sealed by the seal 46, while the distributing sieve 45 is vertically above the opening 44. During the movement of the carriage 8 out of the position I into the position II the driving pin 26 passes through an area of the groove 25, which extends coaxially to the axis of rotation 24a so that its distance from the axis of rotation 24a remains constant and the driving pin 30 (and thus the piston 37) remains in its lower, retracted position. The brewing process takes place in the position II of the carriage 8, i.e. hot water is supplied and gets in uniform distribution into the brewing chamber 45 via the distributing sieve 45, traverses the coffee powder deposited on the brewing strainer 52 and is discharged through the coffee line 19. After the completion of the brewing process the remaining coffee can be pressed through the coffee powder and out of the coffee line 19 by means of a short steam blast, the coffee grounds now used up being dried at the same time.

Figure 11:
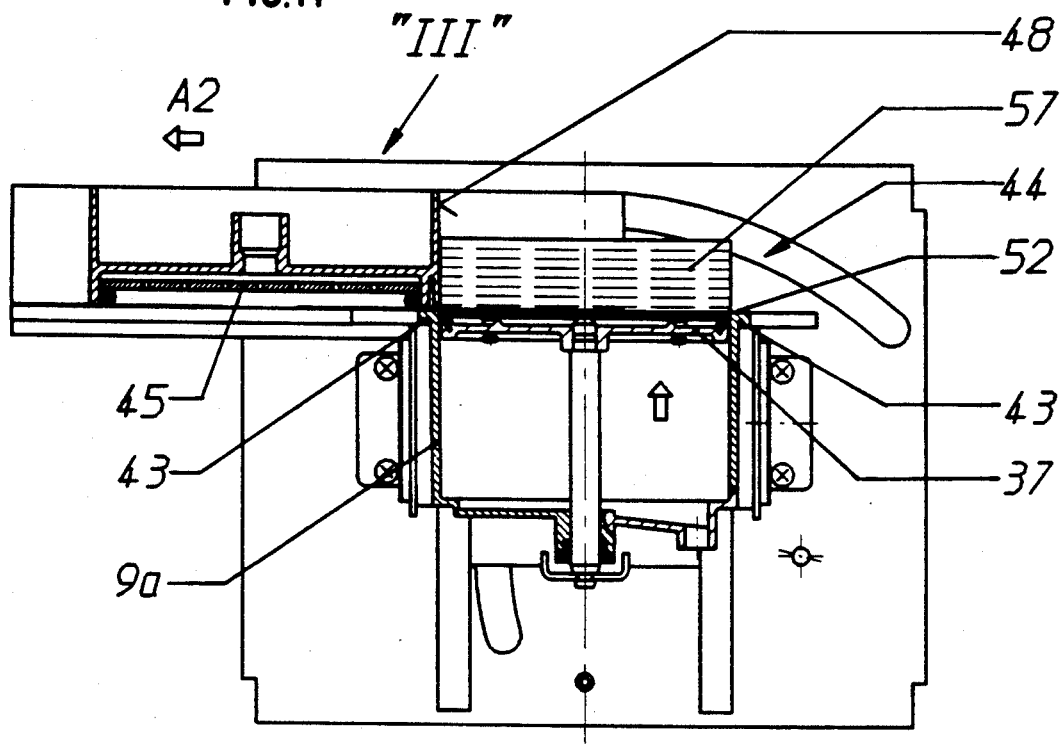

After the completion of the brewing process, the disk 24 is again moved in the direction of the arrow B the carriage moving in the direction of the arrow A2 into its third operating position drawn in FIG. 11 by means of the described mechanisms. The driving pin 26 in the groove 25 moves at the same time in the direction towards the axis of rotation 24a and lifts the piston 37. The carriage is withdrawn that much from the opening 44 in the position III that the first limiting wall 48 acting as a stripper is in alignment with the circumferential wall 9a of the brewing chamber 9. Any coffee grounds adhering to the distributing sieve can be stripped back into the brewing chamber by the upper edge of the sliding plate 43 during the movement in the direction of the arrow A1. If the carriage 8 is moved from the position III into the basic position G by a further rotating of the disk 24 in the direction of the arrow B, the first limiting wall 48 designed as a stripper and leading in the movement pushes the coffee grounds in the form of the complete coffee grounds cake 57 in front of it, until it falls into the receiving receptacle 58 at the side of the brewing chamber 9 opposite to the position III If the carriage 8 has arrived in the basic position G, a limit switch 59 (FIG. 2) is actuated by the disk 24, which switches off the motor 11 until a new brewing process is started by the control means 22.

Thanks to the described constructionally simple construction of the brewing means 7 it is possible to produce a great deal of its elements, e.g. the piston 37, the disk or the carriage 8, from plastics.

Modifying the described and drawn example of embodiment the relative movement between the brewing chamber 9 and the closing element 8 can be effected in kinematic reversal, the closing element being stationary and the brewing chamber moving An arc-shaped relative movement between both elements is also possible. It is furthermore possible to use a separate stripper instead of the limiting wall 48 and to couple it to the movement of the carriage 8. The gear can also be modified within the framework of the given parameters.

I claim:

1. A coffee making machine for making coffee by extracting coffee powder comprising:
    brewing means which contains a brewing chamber having an upper opening formed by a cylindrical side wall, said upper opening being disposed in a substantially horizontal plane;
    a piston being movable up and down within said brewing chamber and having an upwardly facing brewing strainer, said piston being adapted to move said brewing strainer into a position flush with said plane;
    a closing member being adapted to be moved within said plane into a first position, a second position and a third position, said closing member in said first position being located on one side of said brewing chamber releasing said opening for apportioning coffee powder into said brewing chamber, said closing member in said second position closing said opening and said closing member in said third position being located on a substantially opposite side of said brewing chamber with respect to said first position; and
    stripper means being adapted to be moved together with said closing element and positioned to be leading with respect to said closing element when said closing element is moved from said third position toward said first position for stripping off and ejecting said extracted coffee powder after a brewing procedure, said stripper means being located outside said opening in said first, second and third positions of said closing element, said stripper means being adapted to move across said opening when said brewing chamber contains extracted coffee powder to be ejected.

2. The coffee machine according to claim 1, wherein the stripper is fastened to one side of the closing element.

3. The coffee machine according to claim 1, wherein a guide means for the coffee powder to be apportioned is disposed at a side of the closing element not facing the stripper.

4. The coffee machine according to claim 1, wherein the stripper has a shape adapted to the shape of the circumference of the opening of the brewing chamber.

5. The coffee machine according to claim 1, wherein a seal for sealing the piston against the circumferential wall is provided around said brewing strainer, the seal being flush with said plane.

6. The coffee machine according to claim 5, wherein the seal is a lip seal extending outwardly at a slant angle and obliquely in the direction of the brewing chamber.

7. The coffee machine according to claim 1, the machine further comprising gear means for driving said closing element, said piston, and said stripper, wherein the gear means includes a disk for controlling the positions of the piston and of the closing element relative to the brewing chamber and rotatably driven about an axis of rotation, said disk having a continuous groove, and a driving pin affixed outside the axis of rotation, said gear means further including a first and second rocker each movable in pendulum fashion, the first rocker being provided with another driving pin which engages said continuous groove in the disk and the second rocker having a slide guide for said driving pin affixed to the disk outside the axis of rotation.

8. The coffee machine according to claim 7, wherein the first rocker is in driving connection with the piston and the second rocker is in driving connection with the closing element.

9. The coffee machine according to claim 7, wherein the piston includes a support and a linearly moveable guide plate firmly connected therewith, and wherein the first rocker is connected to said linearly movable guide plate.

10. The coffee machine according to claim 7 wherein said closing element includes a guide, and wherein the second rocker is provided with a driving pin which engages in said guide on the closing element.

11. A method of brewing coffee by extracting coffee powder in a coffee making machine having a brewing means including a brewing chamber which has an upper opening within a substantially horizontal plane, a piston having a brewing strainer forming its upper surface which is to be moved up and down in said chamber, a closing element for opening and closing said upper opening, and a stripper means for ejecting extracted coffee powder, the method comprising the steps of:
   positioning said closing element and said stripper means in a first position at one side of said brewing chamber for releasing said opening;
   apportioning said coffee powder into said brewing chamber through said opening after said piston has been moved down;
   moving said closing element within said plane into a second position for closing said opening;
   brewing said coffee by extracting said coffee powder;
   moving said closing element and said stripper means within said plane into a third position on the side of said brewing chamber opposite said first position;
   moving said piston upwardly until said brewing strainer is flush with said plane; and
   moving said closing element and said stripper means to said first position on said one side of said brewing chamber with said stripper means leading with respect to said closing element for stripping off and ejecting said extracted coffee powder, said stripper means remaining substantially on said one side of said brewing chamber until further coffee powder has been apportioned.

12. A coffee making machine comprising:
   a brewing chamber having an upper opening formed by a cylindrical wall, said upper opening being in a substantially horizontal plane;
   a piston movable up and down within said brewing chamber;
   a closing member movable within said plane; and
   stripper means movable together with said closing member,
   the machine further comprising motor drive means including gear means for driving said piston, said closing member and said stripper means, said gear means including a disk controlling the movements of said piston, said stripper means and said closing element relative to said brewing chamber, said disk having a continuous groove, an axis of rotation and a driving pin affixed to said disc outside said axis of rotation, said disk being rotatable about said axis of rotation, said gear means further containing a first and a second rocker movable in pendulum fashion, said first rocker being provided with another driving pin which engages said continuous groove in said disk, and said second rocker having a slide guide engaged by said driving pin, said first rocker being in driving connection with said piston and said second rocker being in driving connection with said closing element and said stripper means.

13. The coffee making machine according to claim 12 wherein said stripper means is positioned to be leading during stripping movement with said closing element.

* * * * *